Oct. 16, 1962 U. W. P. ANDERS 3,058,490
MOUNTING OF BAROMETER BOXES IN REGULATOR HOUSINGS, PARTICULARLY
FOR MOTOR VEHICLES
Filed Aug. 4, 1958
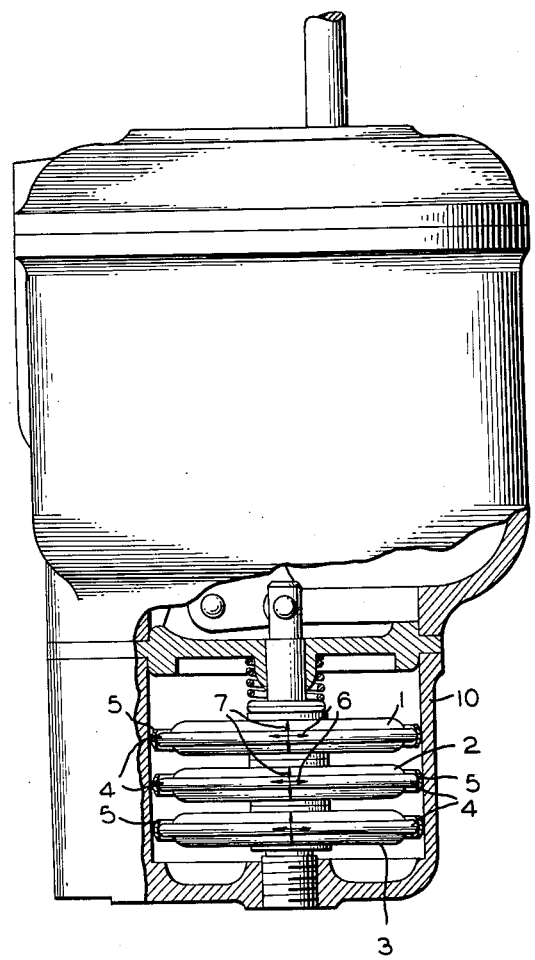
INVENTOR.
ULRICH W. P. ANDERS
BY Dicke and Craig
ATTORNEYS 3,058,490
MOUNTING OF BAROMETER BOXES IN REGULATOR HOUSINGS, PARTICULARLY FOR MOTOR VEHICLES
Ulrich W. P. Anders, Stuttgart-Unterturkheim, Germany, assignor to Daimler-Benz Aktiengesellschaft, Stuttgart-Unterturkheim, Germany
Filed Aug. 4, 1958, Ser. No. 753,061
Claims priority, application Germany Aug. 9, 1957
9 Claims. (Cl. 137—786)

The present invention relates to the mounting and slidable seating of pressure cells or barometer boxes in regulator housings, preferably of motor-vehicle drive-units and in similar aggregates or units.

The problem underlying the present invention lies in the desirability as well as operational necessity to provide for such pressure cells or barometer boxes a mounting or slidable seating which protects the barometer cells or boxes which themselves are relatively sensitive anyhow against excessively large mechanical loads, for example, against vibrations, and which prevents a chattering of the pressure boxes as a result of vibrations and shocks which emanate in motor vehicles from the unevenness of the road or which prevents a pounding and/or beating of these pressure cells or boxes against the bearing surfaces thereof.

Simultaneously therewith, however, the pressure boxes or barometric cells must remain readily movable within the housings thereof and therewith have to be readily slidable so that during measuring movements thereof they are not impeded in the measuring movements thereof by unnecessary friction.

In the prior art devices of this type, it had always been fraught with difficulty to reconcile these two requirements and to provide a bearing or mounting of the barometric pressure boxes or cells so as to simultaneously shield them against vibrations and shocks which occur continuously in motor vehicles during operation thereof and to prevent impeding the measuring movements thereof which must be able to take place with a minimum of friction so as to permit the barometric pressure boxes or cells to function properly when they undergo movements caused by changes in the atmospheric pressure.

These shortcomings and disadvantages of the prior art are eliminated by the present invention in that a band of synthetic material is placed about the outer edge of the barometric box or cell which band supports the pressure cell or box against the guide wall of the regulator housing while simultaneously therewith enabling an unimpaired sliding movement thereof along the surfaces of the guide walls of the regulator housing.

Preferably, an elastic band of synthetic material is used in accordance with the present invention which in the form of a piece of hose is placed under tension about the outer edge of the barometric pressure box or cell constructed preferably of symmetrical shape. The band may be made, for example, of "Vulkollan," of "Teflon," of a polyamide of suitable nature or of a similar material.

Accordingly, it is an object of the present invention to provide a mounting and bearing support for barometric cells or pressure boxes within the regulator housings thereof which eliminate the disadvantages and shortcomings of the prior art.

It is another object of the present invention to provide a mounting and slidable seating for the barometric boxes in the regulator housing thereof which prevents inaccurate readings or damage to the boxes by reason of vibrations or shocks transmitted to the vehicle from the road bed normally likely to influence the accuracy of the measurements and to cause damage to the boxes or cells.

Still another object of the present invention is to provide a seating structure for the barometric pressure boxes or cells within the regulator housings thereof in motor vehicle drive units which fulfills all the purposes and objects mentioned hereinabove without impairing the slidability of the pressure boxes within the housing pursuant to changes in atmospheric pressure.

These and other objects, features and advantages of the present invention will become more obvious from the following description when taken in connection with the accompanying drawing, which shows, in the single FIGURE thereof, a partial cross-sectional view of a preferred embodiment of the mounting of barometric pressure boxes or cells within the regulator housing thereof in accordance with the present invention.

Referring now to the drawing, which shows a control installation in accordance with the present invention, three barometric pressure boxes or cells designated by reference numerals 1, 2 and 3 are connected in series one behind the other. The three cells or boxes 1, 2 and 3 are surrounded along the outer peripheries 4 thereof, which in the embodiment illustrated herein are of circular configuration, with elastic bands 5 of synthetic material. The outer peripheries 4 of each individual cell have relatively small radius of curvature in cross-section so that the thickness thereof axially of the cell is substantially less than the thickness of the cell itself, and the narrow elastic bands tend to wrap around the periphery, as seen in the drawing, so that the bands are self-retained in position on these peripheries. The elastic bands 5 are illustrated in the single figure in cross section. By the use of these elastic bearing bands 5, the barometric cells or boxes 1, 2 and 3 are damped during vibrations thereof in the radial direction as indicated by the arrows 6 against the guide housing 10 of the regulator and are slidingly supported during the movements thereof in the axial direction as indicated by the arrows 7.

"Vulkollan" and "Teflon" are trade names of suitable synthetic materials commercially available which may be used for purposes of the present invention.

While I have shown and described one preferred embodiment in accordance with the present invention, it is understood that the same is not limited thereto but is susceptible of many changes and modifications within the spirit and scope of the present invention. For example, any suitable elastic material which has the desired absorption or damping characteristics while at the same time facilitating the sliding movements may be used for the bands 5. Additionally, the barometric cells or boxes 1, 2 and 3 may be of any suitable configuration, for example, of square configuration, hexagonal configuration, etc. Thus, it is obvious that the present invention is susceptible of many changes and modifications within the scope and spirit of the present invention, and I, therefore, intend to cover all such changes and modifications as encompassed by the scope of the appended claims.

I claim:
1. A slidable seating structure for barometric cells in regulator housings comprising a regulator housing means, barometric pressure box means within said housing means, and means including band means made of synthetic material placed about the outer edge of said pressure box means for supporting the latter against the wall of said regulator housing means while enabling at the same time unimpaired sliding movements thereof substantially axially of said housing means.

2. A slidable seating structure for barometric cells according to claim 1, wherein said synthetic material is selected from the group consisting of "Vulkollan," "Teflon," and a polyamide having suitable absorption and sliding properties.

3. A slidable seating structure for barometric boxes adapted to slide during measuring movements thereof along guide walls provided within regulator housings installed in motor-vehicle drive-units, comprising a regulator housing means having guide wall means provided therein, barometric pressure box means within said housing means, and means including band means made of synthetic material placed about the outer edge of said pressure box means, said band means supporting said pressure box means against said guide wall means of said regulator housing means while enabling at the same time unimpaired sliding movements thereof along said guide wall means.

4. A slidable seating structure for barometric boxes according to claim 3, wherein said band means are in the form of short pieces of hose placed under tension about the outer periphery of said pressure box means.

5. A slidable seating structure for barometric boxes according to claim 4, wherein said barometric pressure box means are of cylindrical shape.

6. A slidable seating structure for barometric boxes according to claim 5, wherein said barometric pressure box means includes a series of cells each having a peripheral portion having in cross-section a small radius of curvature, wherein said band means includes a separate piece of hose about the peripheral portion of each cell and of sufficient width to tend to wrap around said peripheral portion when placed under tension thereon.

7. A slidable seating structure for barometric boxes according to claim 5, wherein said synthetic material is selected from the group consisting of "Vulkollan," "Teflon," and a polyamide having analogous absorption and sliding characteristics.

8. A slidable seating structure for barometric boxes according to claim 3, wherein said synthetic material is selected from the group consisting of "Vulkollan," "Teflon," a polyamide and other appropriate materials having the desired elastic, absorptive and sliding-facilitating characteristics.

9. A slidable seating structure for barometric cells in regulator housings, comprising a regulator housing, barometric pressure box means within said housing, said housing including an inner wall surface, said pressure box means including a peripheral surface movable within said housing closely adjacent to and along said wall surface, and means including a material placed at said peripheral surface and located between said peripheral surface and said wall surface to provide unimpaired sliding movement of said peripheral surface relative to said wall surface and to cushion the movement of said peripheral surface when the box means is subjected to shocks tending to move it transversely of the direction of sliding movement of its peripheral surface.

References Cited in the file of this patent
UNITED STATES PATENTS

| | | |
|---|---|---|
| 1,712,882 | Gleason et al. | May 14, 1929 |
| 1,946,224 | Mastrangel | Feb. 6, 1934 |
| 2,531,780 | Mock | Nov. 28, 1950 |
| 2,804,886 | White | Sept. 3, 1957 |
| 2,894,793 | Robinson | July 14, 1959 |